S. PEACOCK.
PROCESS OF MAKING PHOSPHORUS PENTOXID AND TITANIUM COMPOUNDS.
APPLICATION FILED AUG. 2, 1909.
995,897.
Patented June 20, 1911.
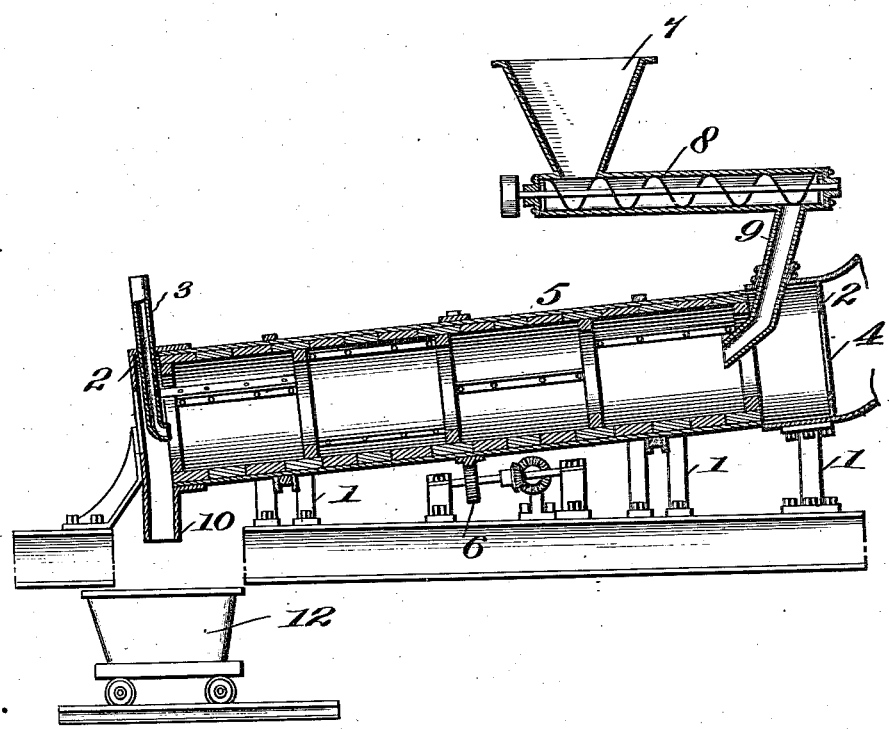

UNITED STATES PATENT OFFICE.

SAMUEL PEACOCK, OF CHICAGO, ILLINOIS, ASSIGNOR TO AMERICAN CYANAMID COMPANY, OF NEW YORK, N. Y., A CORPORATION OF MAINE.

PROCESS OF MAKING PHOSPHORUS PENTOXID AND TITANIUM COMPOUNDS.

995,897.  Specification of Letters Patent.  Patented June 20, 1911.

Application filed August 2, 1909. Serial No. 510,931.

*To all whom it may concern:*

Be it known that I, SAMUEL PEACOCK, a citizen of the United States, residing at Chicago, in the county of Cook and State of Illinois, have invented a certain new and useful Process for Making Phosphorus Pentoxid and Titanium Compounds; and I do hereby declare the following to be a full, clear, and exact description of the invention, such as will enable others skilled in the art to which it appertains to make and use the same.

This invention relates to a process of making pentoxid of phosphorus, ($P_2O_5$) and titanium compounds from lime phosphates and titanic oxid ($TiO_2$), in a simple and comparatively inexpensive manner.

To this end the invention consists in the novel steps and combinations of steps constituting my process, more fully hereinafter disclosed and particularly pointed out in the claims.

Referring to the accompanying drawings forming a part of this specification, in which the figure is a sectional diagrammatic view of a well known type of furnace suitable for carrying out my purpose, 1 represents any suitable supports, 2 stationary end closures provided with an inlet 3 for the fuel and an exit 4 for the gases.

5 represents a rotating barrel part, 6 means for rotating the same, 7 a hopper for receiving the rock mixture, 8 a screw conveyer for the same, 9 a delivery spout leading into the furnace, 10 a suitable delivery passage for the roasted products consisting largely of calcium compounds of iron, aluminum, silica and titanium, and 12 a suitable receptacle for receiving the same.

The following analysis of phosphate of lime suitable for this purpose, will serve as a basis of computation:—

Pentoxid of phosphorus......... 30%
Lime........................... 41%
Alumina........................ 5%
Iron oxid...................... 3%
Silica......................... 14%
Water, etc..................... 7%
                               ----
                               100%

In carrying out my invention, I proportion the mixtures of phosphates of lime and oxid of titanium in accordance to the following reactions:—

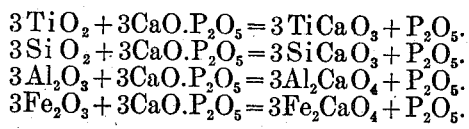

It is to be understood, however, that one or more of the various basic lime compounds of titanium, of silica, of alumina, or of ferric oxid may be produced either wholly or in part in place of the various lime compounds detailed in the above reactions. That is to say, instead of monocalcium titanate, $CaO.TiO_2$, dicalcium titanate, $2CaO.TiO_2$, or tri-calcium titanate $3CaO.TiO_2$, may be produced. Such basic compounds would be formed should there be present an excess of CaO, due to an imperfect mixing of the charge—a contingency not possible to guard against at all times. In like manner, the following basic silicates may be formed:—Instead of the mono-calcium silicate—$CaO.SiO_2$,—we may have the di-calcium silicate—$2CaO.SiO_2$,— or the tri-calcium silicates—$3CaO.SiO_2$. The corresponding aluminum salts are:— Instead of the monocalcium aluminate— $CaO.Al_2O_3$,—we may have the dicalcium aluminate—$2CaO.Al_2O_3$,—or the tricalcium aluminate—$3CaO.Al_2O_3$. The corresponding ferric iron salts that may be formed are:—Instead of the mono-calcium ferrite— $CaO.Fe_2O_3$—we may have the dicalcium ferrite—$2CaO.Fe_2O_3$,—or the tricalcium ferrite—$3CaO.Fe_2O_3$. The di and tri calcium silicates, aluminates and ferrites above are basic in character, as is well known. In place of a pure oxid of titanium, a crude mineral or precipitates may be used; the accompanying iron oxids, silica, alumina, etc., present, being computed to, and the proportioning of the quantity of lime phosphate in the mixture adjusted for, the series of reactions accredited to the similar impurities in the crude phosphate of lime.

The mixture of phosphate of lime and oxid of titanium are proportioned in compliance with the requirements of the above general reaction, when the whole is finely pulverized, thoroughly mixed together and passed through and heated to about 1500 degrees C. in any suitable furnace, preferably one of the type shown herewith. During this treatment the lime combinations set forth above take place, and the pentoxid of phosphorus set free is expelled by volatilization, when it is either absorbed in water or condensed, or it may be used as an acid upon fresh quantities of phosphate of lime, as occasion may justify or require.

On the basis of furnacing 2000 pounds of phosphate of lime of the analysis given above, the proportioning of materials would be substantially as follows:—One short ton of such phosphate contains:—

| | | | | |
|---|---|---|---|---|
| Lime | 820 lbs. | | | |
| Alumina | 100 " | which requires | 55 lbs. | of lime. |
| Ferric oxid | 50 " | " " | 21 " | " " |
| Silica | 280 " | " " | 260 " | " " |
| Total lime required | | | 336 lbs. | |

As one ton of the phosphate contains 820 pounds of lime, and 336 pounds are required to satisfy the silica and other impurities contained in the same, there remains 484 pounds of lime to be combined with the oxid of titanium. In accordance with the combining equivalents of lime and oxid titanium, one pound of the former requires 1.43 pounds of the latter; and, therefore, the 484 pounds of surplus lime require 692 pounds of oxid of titanium, and the furnace mixture should consist of:—

| | |
|---|---|
| Phosphate of lime | 2,000 pounds. |
| Oxid of titanium | 692 " |

The usefulness of this invention rests upon:—1. The formation of lime salts of titanium oxid, which have the property of being decomposed by hot alkaline solutions, and, therefore, valuable forms of the pure oxid may be readily and cheaply produced. 2. The comparatively inexpensive production of pentoxid of phosphorus free from arsenic or other injurious impurities.

It is evident that those skilled in the art may vary the above procedure without departing from the spirit of the invention, and, therefore, I do not wish to be limited to the exact disclosures except as may be required by the claims.

In my co-pending application #502,793, filed June 17, 1909; I have disclosed a process for making calcium aluminate and phosphoric acid; in my co-pending application #515,803, filed September 2, 1909, I have disclosed a process for making pentoxid of phosphorus, calcium silicates and calcium aluminates; and in my co-pending application #510,932, filed August 2, 1909, I have disclosed a process of making phosphorus pentoxid and iron compounds of calcium.

What I claim is—

1. The process of producing the pentoxid of phosphorus from oxid of titanium and lime phosphate which consists in mixing said oxid of titanium and phosphate in such proportions that chemically equivalent quantities of calcium oxid will be supplied to the oxid of titanium present in the mixture to form a titanium-lime compound; and in heating said mixture to a temperature sufficient to form said compound and to free said pentoxid of phosphorus from the lime phosphate, substantially as described.

2. The process of producing the pentoxid of phosphorus from oxid of titanium and phosphate rock which consists in mixing said oxid of titanium and phosphate rock in such proportions that sufficient calcium oxid will be present in the mixture to chemically react with substantially all the oxid of titanium, alumina, ferric oxid, and silica that may also be present; and in heating the mixture to a temperature sufficient to bring about such reactions and to free said pentoxid from said phosphate; substantially as described.

3. The process of producing $P_2O_5$ and $CaTiO_3$ from oxid of titanium and phosphate rock in a single operation which consists in mixing 2000 pounds of said rock with substantially 692 pounds of oxid of titanium, in heating the said mixture to substantially 1500 degrees C.; in collecting the $P_2O_5$ driven off, and in collecting the $CaTiO_3$ formed; substantially as described.

In testimony whereof, I affix my signature, in presence of two witnesses.

SAMUEL PEACOCK.

Witnesses:
 LEO F. MURPHY,
 FRANK S. WASHBURN.